US011935493B2

(12) United States Patent
Van De Sluis et al.

(10) Patent No.: US 11,935,493 B2
(45) Date of Patent: Mar. 19, 2024

(54) VIRTUAL WINDOW DEVICE

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Leendert Teunis Rozendaal, Valkenswaard (NL); Michel Cornelis Josephus Marie Vissenberg, Roermond (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/907,778

(22) PCT Filed: Feb. 23, 2021

(86) PCT No.: PCT/EP2021/054371
§ 371 (c)(1),
(2) Date: Aug. 29, 2022

(87) PCT Pub. No.: WO2021/170549
PCT Pub. Date: Sep. 2, 2021

(65) Prior Publication Data
US 2023/0145323 A1 May 11, 2023

(30) Foreign Application Priority Data
Feb. 28, 2020 (EP) ..................................... 20160102

(51) Int. Cl.
*G06T 15/00* (2011.01)
*G09G 3/34* (2006.01)
*H05B 47/11* (2020.01)

(52) U.S. Cl.
CPC ............. *G09G 3/342* (2013.01); *H05B 47/11* (2020.01); *G09G 2360/144* (2013.01); *G09G 2380/16* (2013.01)

(58) Field of Classification Search
CPC ............. G09G 3/342; G09G 2360/144; G09G 2380/16; H05B 47/11; H04N 13/366; G09F 27/00
(Continued)

(56) References Cited

U.S. PATENT DOCUMENTS 5,251,392 A * 10/1993 McManigal ............ G09F 27/00
40/442
9,342,467 B1 5/2016 McGrath et al.
(Continued)

FOREIGN PATENT DOCUMENTS

EP     2317503 A1    5/2011
JP     2008202283 A  9/2008
(Continued)

*Primary Examiner* — Abdul-Samad A Adediran

(57) ABSTRACT

A virtual window device (100), comprising (i) a display (110) arranged in a first plane (A), wherein the display (110) is arranged to provide a first output (120) for rendering a first image of a view through a window (130) onto a virtual planar surface (140) that is oriented parallel to the display (110) along an axis (C), perpendicular to the first plane (A), (ii) a frame (150) projecting from the display (110), and wherein an edge (160) of the frame (150), oppositely arranged the display (110), spans a second plane (B), (iii) a lighting element (170) configured to emit a second output (180) onto the virtual planar surface (140), wherein the lighting element (170) is arranged within the virtual window device (100) at a distance (D) from the second plane (B), along the axis (C), wherein the second output (180) has a directionality, the directionality being one or more of a spatial direction, a beam angle, a beam width, a light output distribution and a diffusivity, and (iv) a unit (190) configured
(Continued)

to register a content property of the first image and to control the directionality of the second output (180) as a function of the registered content property of the first image.

13 Claims, 6 Drawing Sheets

(58) Field of Classification Search
USPC .............................................. 40/442; 345/419
See application file for complete search history.

(56) References Cited

U.S. PATENT DOCUMENTS

| | | | |
|---|---|---|---|
| 2012/0113097 A1* | 5/2012 | Nam | H04N 13/366 |
| | | | 345/419 |
| 2013/0293152 A1 | 11/2013 | Barroso et al. | |
| 2014/0292206 A1 | 10/2014 | Lashina et al. | |

FOREIGN PATENT DOCUMENTS

| | | | |
|---|---|---|---|
| KR | 20150048557 | A | 5/2015 |
| WO | 2006033063 | A1 | 3/2006 |
| WO | 2006048832 | A2 | 5/2006 |

* cited by examiner

VIRTUAL WINDOW DEVICE

CROSS-REFERENCE TO PRIOR APPLICATIONS

This application is the U.S. National Phase application under 35 U.S.C. § 371 of International Application No. PCT/EP2021/054371, filed on Feb. 23, 2021, which claims the benefit of European Patent Application No. 20160102.8, filed on Feb. 28, 2020. These applications are hereby incorporated by reference herein.

FIELD OF THE INVENTION

The present invention generally relates to lighting devices in the form of virtual window devices, or so called artificial windows, which are capable of providing a realistic appearance of authentic windows.

BACKGROUND OF THE INVENTION

It is often undesired that rooms or areas of office spaces, homes, stores, etc., lack a source of outside light. For example, it may be preferred to provide a source of outside light in basements for an increased attractiveness of the space and/or for an increased sense of well-being. Furthermore, offices spaces may be rendered more attractive, appealing and/or may affect the people working there positively if e.g. conference rooms, office rooms and/or cubicles have windows for letting in outside light and/or for providing a view to the outside environment.

In case it is not possible nor desirable to provide one or more real windows to e.g. an office space, home, or store, an installation of a virtual window device, or so called artificial window, may constitute an interesting alternative. Devices of this kind are configured to mimic an outdoor view, daylight, sunshine, or the like, in order to provide a realistic appearance of authentic windows. Typical examples of artificial daylight windows are artificial skylights. These skylights may have an optical architecture that is based on a focused beam of light that shines on a light-transmissive window that contains nanoparticles to scatter part of the blue light in the light beam. This creates a blue sky effect, and at the same time, a direct beam of artificial sunlight from the window.

In order to create a realistic skylight impression, a specific depth of the virtual window devices is required, since observers need to believe that there is a flat roof between the ceiling and the (simulated) sky view. Moreover, further development of virtual window devices is required to give the observer the impression of an authentic window. Hence, it is of interest to improve the properties of virtual window devices in order to augment the observer's impression of the authenticity of the window.

SUMMARY OF THE INVENTION

Hence, it is of interest to improve the properties of lighting devices in the form of artificial windows, and in particular lighting devices of these kinds which are intended for providing an outdoor view, sky light(s), or the like.

This and other objects are achieved by providing a virtual window device having the features in the independent claim. Preferred embodiments are defined in the dependent claims.

Hence, according to a first aspect of the present invention, there is provided a virtual window device, comprising a display arranged in a first plane, A. The display is arranged to provide a first output for rendering a first image of a view through a window onto a virtual planar surface that is oriented parallel to the display along an axis, C, perpendicular to the first plane, A. The virtual window device further comprises a frame, wherein the frame projects from the display, and wherein an edge of the frame, oppositely arranged the display, spans a second plane, B, parallel to the first plane, A. The virtual window device further comprises a lighting element configured to emit a second output onto the virtual planar surface, wherein the lighting element is arranged within the virtual window device at a distance, D, from the second plane, B, along the axis, C. The virtual window device further comprises a unit configured to control a directionality of the second output as a function of at least one content property of the first image. The term "content property of the first image" refers to a property of the visual content of the first image, and it may therefore also be referred to as a "visual content property".

Thus, the present invention is based on the idea of providing a virtual window device for arrangement on (in) a wall or in a ceiling. The virtual window device is configured to provide a first output for rendering an impression to an observer of a first image of a view through a window, such as an outdoor view, a view of nature or an urban environment, a view of a sky, etc. The virtual window device is further configured to control a directionality of a second output, via a lighting element arranged within the virtual window device, as a function of one or more properties of the first image. Hence, the virtual window device is configured to render a dynamic light effect, by controlling the directionality of the second output, which matches the content property(ies) of the first image.

The present invention is advantageous in that the virtual window device may realistically achieve the effect of a view through a window, wherein the authenticity of the window view by the first image to an observer may be even further augmented by the directionality of the second output which is arranged to match the content(s) of the first image. Consequently, the virtual window device may render an authentic and/or realistic impression to an observer of being a 'real' window.

The present invention is further advantageous in that the lighting element, which provides the second output, may be arranged within the virtual window device such that it may not be visible for an observer, which may even further increase the authenticity of the virtual window device. More specifically, the lighting element may be 'hidden' from an observer positioned at an angle with respect to the virtual window device. The described arrangement of the lighting element within the virtual window device is particularly beneficial in case the virtual window device is configured to create an artificial daylight effect.

The present invention is further advantageous in that the versatility of the virtual window device, due to the various settings, configuration and/or design thereof, is able to achieve a realistic and/or authentic impression of a 'real' window.

The present invention is further advantageous in that the virtual window device may be provided with one or more display and lighting technologies such as LCD, OLED, QLED, microLED, etc. It will be appreciated that the numerous advantages of using LED technology may be provided in case LEDs are used as light source in the virtual window device. Compared to incandescent lamps, fluorescent lamps, neon tube lamps, etc., LEDs provide numerous advantages such as a longer operational life, a reduced power consumption, and an increased efficiency related to the ratio between light energy and heat energy.

The virtual window device of the present invention comprises a display arranged in a first plane. The first display part is arranged to provide a first output for rendering a first image of a view through a window. The first image of a view through a window may be an outdoor view, daylight, sunshine, or the like. The display is arranged to provide the first output onto a virtual planar surface that is oriented parallel to the display along an axis, perpendicular to the first plane. By "virtual planar surface", it is here meant an imaginary surface or area in front of the virtual window device onto which the first output is projected. The virtual window device of the present invention further comprises a frame which projects from the display. An edge of the frame, oppositely arranged the display, spans a second plane, parallel to the first plane. The virtual window device further comprises a lighting element configured to emit a second output onto the virtual planar surface. By "lighting element", it is here meant one or more lighting elements or light sources configured to emit light during operation. The lighting element is arranged within the virtual window device at a distance from the second plane along the axis. Hence, the lighting element is arranged within the virtual window device at a distance from the plane spanned by the edge of the frame, wherein the frame projects from the display. The virtual window device further comprises a unit configured to control a directionality of the second output as a function of at least one content property of the first image. By the term "directionality", it is here meant one or more of (spatial) direction, beam angle, beam width, light output distribution, diffusivity, etc., of the second output. Hence, the unit is configured to control the directionality of the second output as a function of (dependently on) one or more properties of the first image.

According to an embodiment of the present invention, the lighting element may comprise at least a first light source arranged to emit light with a first directionality and a second light source arranged to emit light with a second directionality, different from the first directionality, wherein the unit is coupled to the lighting element and is configured to operate at least one of the first light source and the second light source in order to control the directionality of the second output. Hence, the virtual window device may comprise at least two different (sets of) light sources, wherein the unit is configured to operate one or more of these (sets of) light sources for controlling the directionality of the second output. The present embodiment is advantageous in that the authenticity of the window view by the first image to an observer may be even further augmented by the directionality of the second output via the individual control of the two or more light sources by the unit. For example, the first light source may be provided as a linear light array at one or more sides of the virtual window device. The first light source may provide a light output with a relatively high brightness. Furthermore, the virtual window device may comprise a second light source, wherein the second light source may constitute the backlight of the display. The second light source may be arranged to emit diffuse light with a relatively low brightness.

According to an embodiment of the present invention, the unit is configured to control the directionality of the second output so that the second output is provided onto a virtual cylindrical surface that is oriented perpendicular to the virtual planar surface. By "virtual cylindrical surface", it is here meant an imaginary cylindrical surface or area in front of the virtual window device, onto which surface or area the second output is projected. Furthermore, by "cylindrical surface", it should be noted that its base or cross section may take on substantially any form, such as a rectangular, square, circular form, or the like.

According to an embodiment of the present invention, the unit may be configured to control the directionality of the second output as a function of time. Hence, the unit of the virtual window device may be configured to control the directionality (e.g. spatial direction, beam angle, beam width, light output distribution, diffusivity, etc.) of the second output as a function of time. For example, the unit may be configured to control the directionality of the second output as a function of time according to a predetermined schedule or setting, e.g. in case the first image of a view through the window is a sunrise, daylight, sunset, or the like. Alternatively, the unit may be configured to control the directionality of the second output as a function of time according to the current first image of a view through the window, e.g. via sensors and/or analysis of the first image. The present embodiment is advantageous in that the authenticity of the virtual window device may be increased even further.

According to an embodiment of the present invention, the lighting element may be arranged in the first plane, adjacent the display. The lighting element may be arranged to emit the second output into an adjacent space or room of the virtual window device at angles which correspond to realistic angles of a sun beam. The present embodiment is advantageous in that the authenticity of the virtual window device may be increased even further whilst at the same time providing the lighting element in a position of the virtual window device in which it may be at least partially hidden from the view of an observer.

According to an embodiment of the present invention, the display may have a polygon shape, and the lighting element may be arranged at a corner of the display. For example, the display may be rectangular, and the lighting element may be arranged at a corner between the display and the frame. The present embodiment is advantageous in that the lighting element hereby may be provided relatively far away from the second plane, B, i.e. in a position of the virtual window device in which it may be at least partially hidden from the view of an observer.

According to an embodiment of the present invention, the lighting element may comprise a linear lighting element array arranged along an edge of the display. By "linear lighting element array", it is here meant an array, arrangement or segment of lighting element(s) arranged linearly, such as linear arrays of LEDs, OLEDs, or the like. For example, in case the virtual window device comprises a rectangular display, each of the four sides of the display may be provided with a linear lighting element array. Each of these linear lighting element arrays may be controllable by the unit in order to control the directionality of the second output emitted by the lighting element as a function of at least one content property of the first image. Alternatively, or additionally, the linear lighting element array may comprise light sources which are individually controllable by the unit in their respective directionality. The present embodiment is advantageous in that the linear lighting element array may be conveniently controlled by the unit in order to provide a relatively high degree of authenticity of the virtual window device during operation. The present embodiment is further advantageous in that the linear lighting element array may be configured to illuminate one or more sides of the frame, which may render an aesthetically appealing effect.

According to an embodiment of the present invention, the lighting element may be arranged within the frame. Hence, the lighting element may be arranged inside the frame of the virtual window device. The present embodiment is advantageous in that the lighting element may emit the second output onto the virtual planar surface whilst at the same time being 'hidden' from an observer positioned at an angle with respect to the virtual window device.

According to an embodiment of the present invention, the lighting element may be arranged within a cavity of the display. For example, the display may comprise one or more holes in which the lighting element(s) may be arranged. The present embodiment is advantageous in that the first image may be rendered even more authentic to an observer. For example, in case of a first image of a view through a window of a sun in the sky, the unit of the virtual window device may be configured to control the directionality of the second output such that the virtual sun may always be present at a predefined position.

According to an embodiment of the present invention, the unit may be configured to register a content property of the first image and to control the second output as a function of the registered content property of the first image. Hence, the virtual window device may be configured to adapt the second output dependent on one or more content properties of the first image, e.g. by registering the content property(ies) via one or more sensors. The present embodiment is advantageous in that the virtual window device hereby may conveniently and efficiently adapt or control the second output with respect to the property(ies) of the image content of the first image in order to augment the authenticity of the virtual window device.

According to an embodiment of the present invention, the unit may be configured to register a property of the light in an environment of the virtual window device and to control the second output as a function of the registered property of the light. Hence, the virtual window device may be configured to adapt the second output dependent on one or more properties of the light in an environment or surrounding of the virtual window device. The present embodiment is advantageous in that the virtual window device may conveniently and efficiently adapt or control the second output in order to provide an even higher degree of authenticity of the virtual window device.

According to an embodiment of the present invention, the frame may comprise a light-emitting element, wherein the unit is coupled to the light-emitting element and is configured to control the light emitted from the light-emitting element as a function of at least one of the at least one content property of the first image, and the directionality of the second output. Hence, the unit is configured to control the light-emitting element as a function of the content property(ies) of the first image and/or the directionality of the second output. The present embodiment is advantageous in that the authenticity of the first image of the virtual window device may be even further increased if light emitted from the light-emitting element in and/or on the frame matches the content properties and/or conditions of the first output for rendering the first image of a view through a window. Therefore, in addition to the lighting element configured to emit the second output for creating the desired directional light effects during operation of the virtual window device, the frame may comprise light-emitting elements which are controlled by the unit as a function of the content property(ies) of the first image and/or the directionality of the second output.

According to an embodiment of the present invention, the unit may be configured to register a property of the light in an environment of the virtual window device and to control the light emitted from the light-emitting element as a function of the registered property of the light. Hence, the unit of the virtual window device may be configured to control and/or adapt the light emitted from the light-emitting element dependent on one or more properties of the light in an environment or surrounding of the virtual window device. The present embodiment is advantageous in that the virtual window device may conveniently and efficiently adapt or control the light emitted from the light-emitting element in order to provide an even higher degree of authenticity of the virtual window device.

According to an embodiment of the present invention, the frame may be rectangular and comprise four side portions, wherein the light-emitting element is arranged within the four side portions, and the unit is configured to control the light emitted from the light-emitting element in each side portion.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
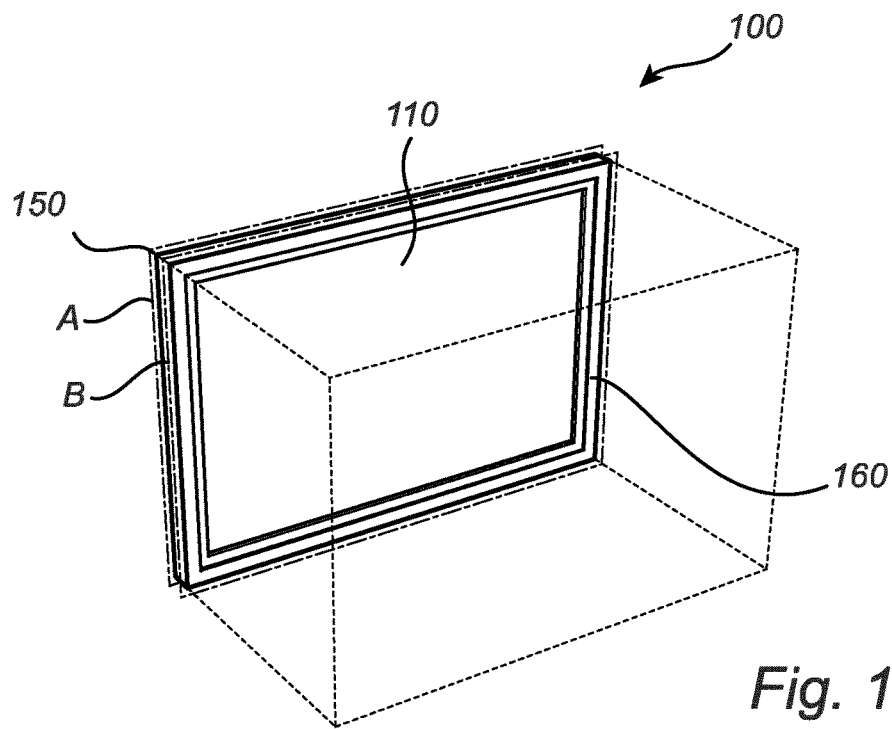
FIGS. 1-2 schematically show perspective views of a virtual window device according to an exemplifying embodiment of the present invention, FIGS. 3, 4a-c and 5 schematically show cross-sectional views of a virtual window device according to examples of the present invention, and FIGS. 6a,b schematically show virtual window devices according to exemplifying embodiments of the present invention.

FIG. 1 schematically shows a perspective view of a virtual window device 100 according to an exemplifying embodiment of the present invention. The virtual window device 100 comprises a display 110 arranged in a first plane, A. Here, the display 110 is exemplified as being rectangular. However, it should be noted that other shapes of the display 110 may be feasible. The virtual window device 100 further comprises a frame 150 which projects from the display 110. In FIG. 1, the frame 150 projects perpendicular from the orientation of the display 110, but it should be noted that the frame 150 alternatively may project obliquely from the orientation of the display 110. An edge 160 of the frame 150, which edge 160 is oppositely arranged the display 110, spans a second plane, B, parallel to the first plane, A.

Figure 2:
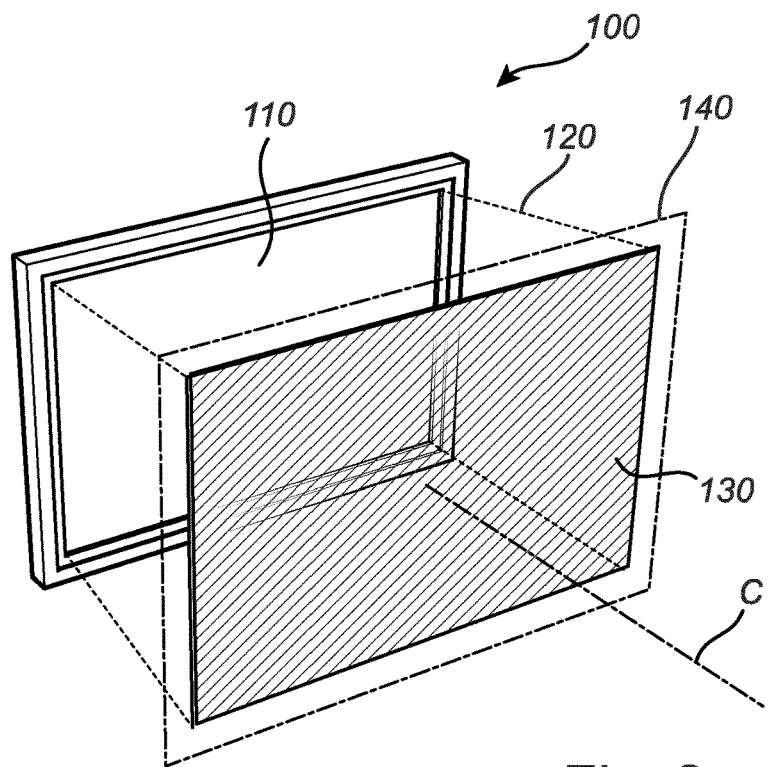

FIG. 2 schematically shows a perspective view of the virtual window device 100 according to FIG. 1. The display 110 is arranged to provide a first output 120 for rendering a first image of a view through a window 130. The first image of a view through a window 130 may be an outdoor view, daylight, sunshine, or the like. The first image may comprise a nature setting or environment (e.g. clouds moving in the wind, trees, fields, etc.), an urban setting or environment (e.g. cars passing by), etc. For example, in case it is desired that the first image renders a skylight, the first output 120 may be configured to emit light within a wavelength range of 400-490 nm, representing blue or blue-like colors. The first image of a view through a window 130 may vary as a function of time, i.e. it may be (time) dynamic. For example, the first image of a view through a window 130 such as an outdoor view, daylight, skylight, sunshine, or the like, may vary as a function of time with respect to one or more properties, such as light intensity, light direction, color of the light, etc. The display 110 is arranged to provide the first output 120 onto a virtual planar surface 140 that is oriented parallel to the display 110. The virtual planar surface 140 constitutes an imaginary surface or area in front of the virtual window device 100 along an axis, C, which is perpendicular to the first plane.

Figure 3:
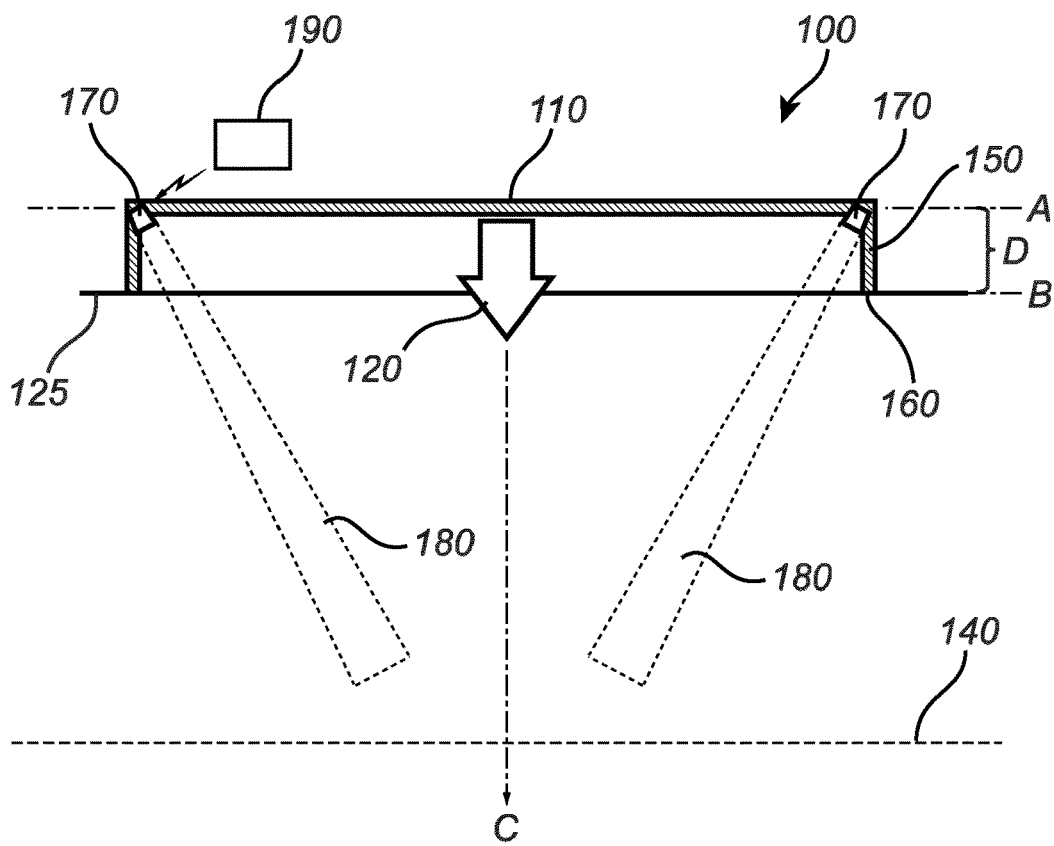
Figure 3:
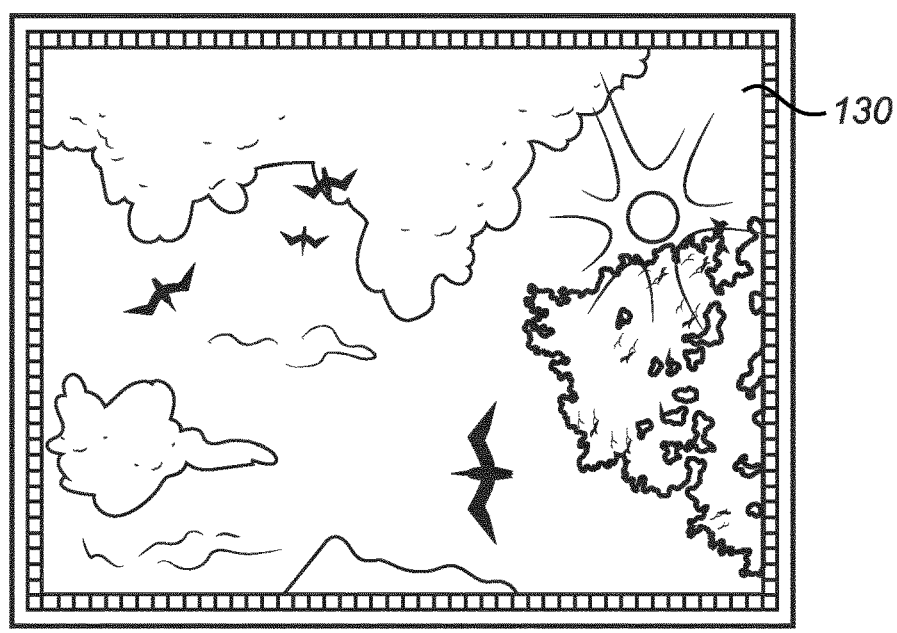

FIG. 3 schematically shows a cross-sectional view of the virtual window device 100 according to FIG. 1 and/or FIG. 2. The virtual window device 100 is fitted into an aperture or cavity of a ceiling 125. The display 110 of the virtual window device 100 is arranged in the first plane, A. The edge 160 of the frame 150, oppositely arranged the display 110, is arranged in the second plane, B, parallel to the first plane, A. Here, the second plane, B, is flush with the plane of the ceiling 125. The virtual window device 100 further comprises a lighting element 170 configured to emit a second output 180 onto the virtual planar surface 140. Here, the lighting element 170 is exemplified as two light sources, but it should be noted that the lighting elements 170 may alternatively comprise substantially any number of light sources, one or more (linear) arrays of lighting elements, etc. According to the example in FIG. 3, the lighting element 170 is arranged in the first plane, A, at a corner of the display 110 and the frame 150. The lighting element 170 is arranged within the virtual window device 100 at a distance, D, from the second plane, B, along the axis, C. The distance, D, may be relatively large, such that the lighting element 170 which provides the second output 180 may not be visible for an observer. More specifically, the lighting element 170 may be 'hidden' from an observer positioned at an angle with respect to the virtual window device 100. According to this example, D=|B−A| along the axis, C.

The virtual window device 100 as exemplified in FIG. 3 further comprises a unit 190. It should be noted that the unit 190 may be arranged within the virtual window device 100 or be (remotely) connected to the virtual window device 100. The unit 190 may be connected to the lighting element 170 and may be configured to control a directionality of the second output 180 emitted from the lighting element 170 as a function of at least one content property of the first image rendered by the display 110 via the first output 120 on the virtual planar surface 140. The directionality of the second output 180 may encompass one or more of (spatial) direction, beam angle, beam width, light output distribution, diffusivity, etc., of the second output 180. The unit 190 is configured to control the directionality of the second output 180 as a function of (dependently on) one or more properties of the first image. For example, the unit 190 may be configured to control the direction of the second output 180 as a function of the direction of the first image as rendered by the first output 120. More specifically, and according to an example, in case the display 110 is arranged to render a first image of a view through a window 130 mimicking a path of the sun in the sky, a sunrise and/or a sunset, the unit 190 may be configured to control the direction of the second output 180 as a function of the direction of this first image. For example, the unit 190 may be configured to control the shape, width and/or angle of the light of the second output 180 as a function of the properties of the beam of the light of the first output 120. Via the control unit 190 of the virtual window device 100, the lighting element 170 may render a beam shape of the second output 180 which matches the shape of the first output 120 of the display 110 for rendering the first image of a view through a window 130. For example, the virtual window device 100 may comprise one or more optical elements (not shown) which may be arranged to create a rectangular beam shape of the second output 180.

According to yet another example, the unit 190 of the virtual window device 100 may be configured to control one or more of the light output distribution, diffusivity, etc., of the second output 180 as a function of the direction of the first image. The virtual window device 100 may, via the unit 190, be configured to vary a mimicked sunlight direction dependent on the time of day and/or time of year. The virtual window device 100 may further be configured to control the second output 180 dependent on e.g. real sunlight entering the room, and/or on other properties of the light in the room/area into which the virtual window device 100 is arranged to provide the first output 170 and second output 180.

The registering of one or more properties of the first image and/or the light in an environment of the virtual window device 100 may be performed by registration means (not shown), for example, (a) light sensor(s), a camera, or the like. It will be appreciated that the registration means can be used to detect the current light properties and/or conditions outside the building where the virtual window device 100 is located. Alternatively, the registration means may comprise one or more indoor sensors, whereby the virtual window device 100 may adjust its second output dependent on the ambient light level in an environment of the virtual window device 100.

In case the virtual window device 100 comprises one or more optical elements (not shown), these optical elements may provide various lighting distributions (e.g. directional distributions, diffusivity distributions, etc.) of the second output 180. It will be appreciated that the virtual window device 100 hereby may mimic sunny vs. cloudy weather conditions with an even higher degree of authenticity to an observer.

According to yet another example, the unit 190 of the virtual window device 100 may be configured to control the directionality (e.g. spatial direction, beam angle, beam width, light output distribution, diffusivity, etc.) of the second output 180 as a function of time. For example, the unit 190 may be configured to control the directionality of the second output 180 as a function of time according to a predetermined schedule or setting, e.g. in case the first image of a view through the window 130 is a sunrise, daylight, sunset, or the like. Alternatively, the unit 190 may be configured to control the directionality of the second output 180 as a function of time according to the current first image of a view through the window 130, e.g. via sensors and/or analysis of the first image.

Figure 4A:
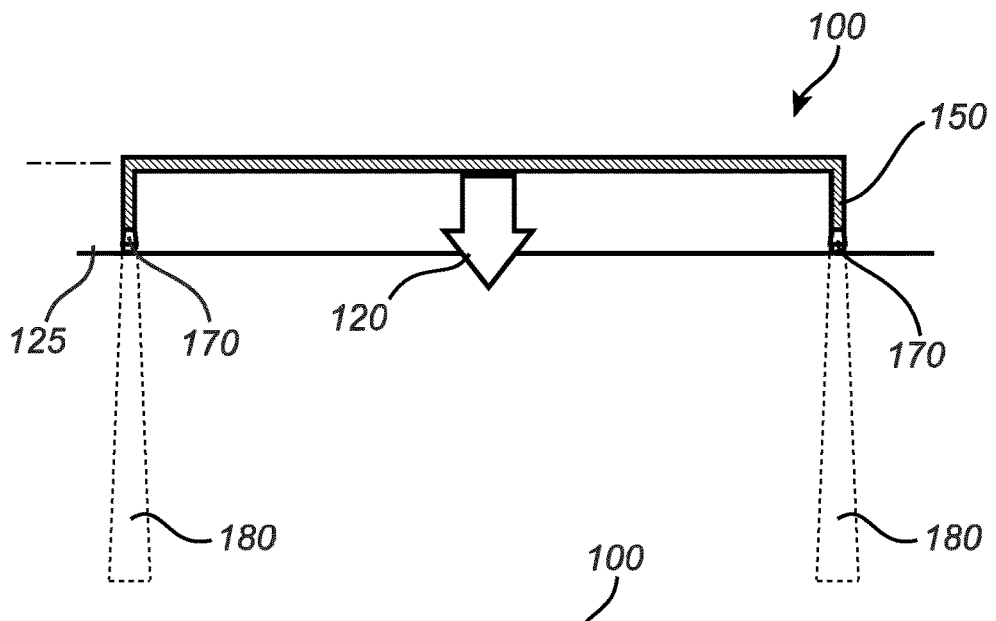
Figure 4B:
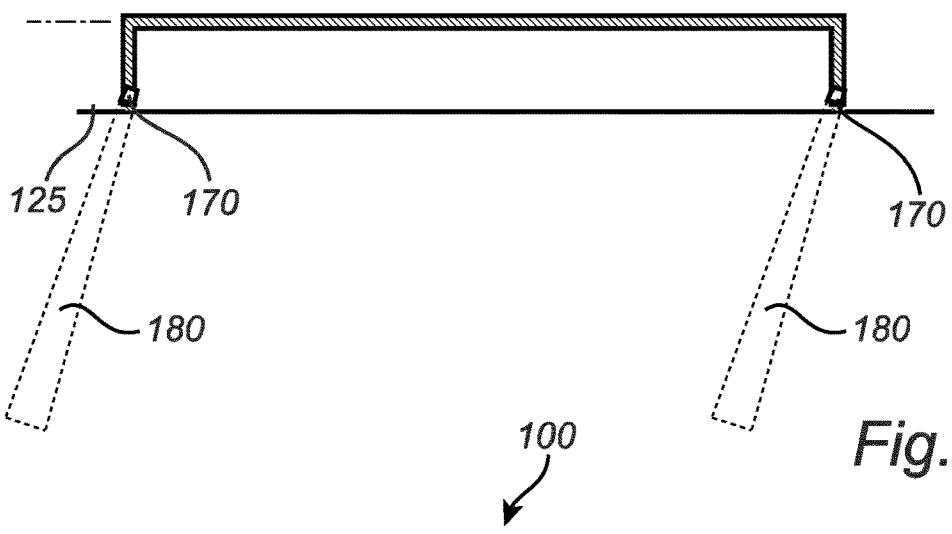
Figure 4C:
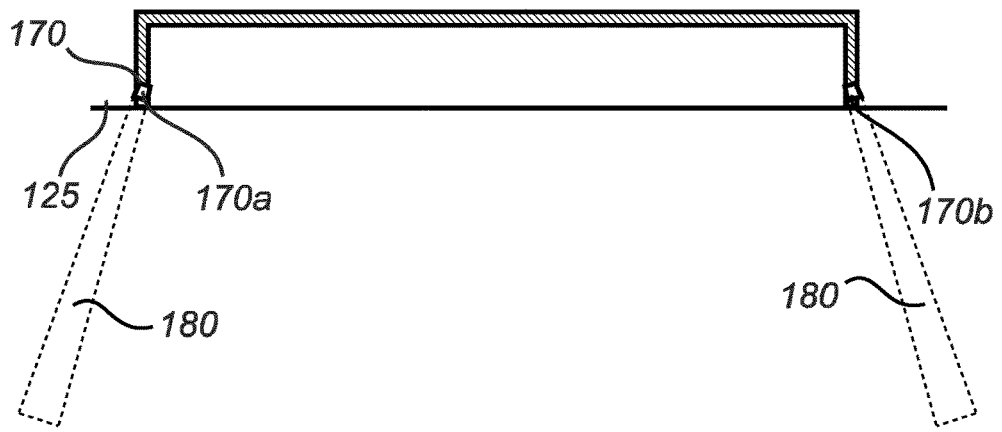

FIGS. 4a-c schematically show cross-sectional views of virtual window devices 100 according to examples of the present invention. It will be appreciated that the virtual window devices of FIGS. 4a-c, arranged in a aperture or cavity of a ceiling 125, are similar to the virtual window devices of FIGS. 1-3, and it is referred to these figures and associated text for an increased understanding. In FIG. 4a, the lighting element 170 configured to emit a second output 180 is arranged within the frame 150. More specifically, the lighting element 170 is arranged within a cavity or slot of the frame 150. Albeit the lighting element 170 is exemplified as two light sources, it should be noted that the lighting element 170 may alternatively comprise substantially any number of light sources, one or more (linear) arrays of lighting elements, etc. In FIG. 4b, the unit (not shown) of the virtual window device 100 is configured to control the directionality (e.g. direction, beam angle, beam width, light output distribution, diffusivity, etc.,) of the second output 180 as a function of one or more properties of the first image rendered by the display 110 via the first output 120. In FIG. 4c, the lighting element 170 comprises a first light source 170a arranged to emit light with a first directionality, and a second light source 170b arranged to emit light with a second directionality, different from the first directionality. The unit (not shown) of the virtual window device 100 is coupled to the lighting element 170 is configured to operate at least one of the first light source 170a and the second light source 170b in order to control the directionality of the second output 180.

Figure 5:
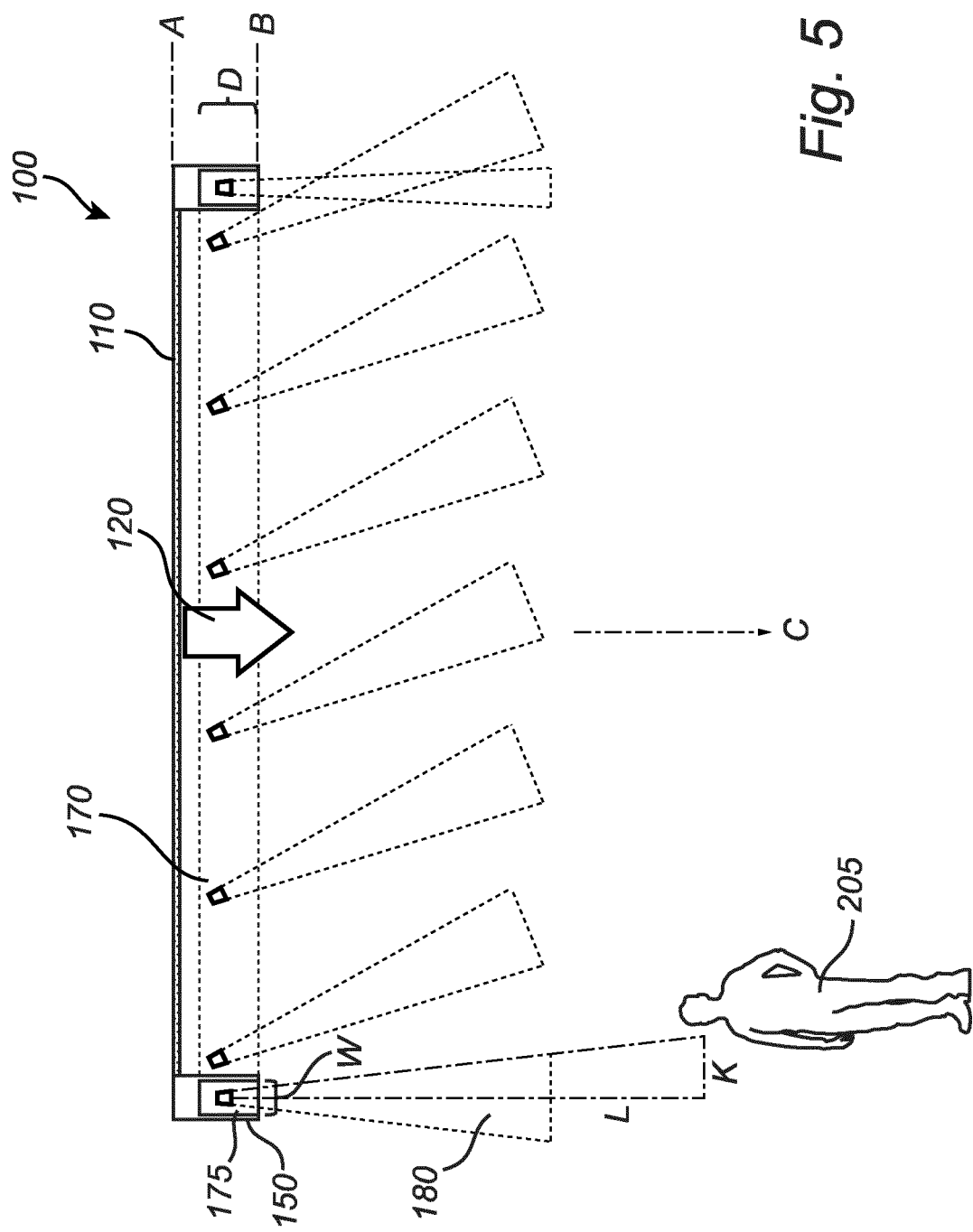

FIG. 5 schematically shows a cross-sectional view of a virtual window device 100 according to an example of the present invention. The virtual window device of FIG. 5 is similar to the virtual window devices of FIGS. 1-4, and it is referred to these figures and associated text for an increased understanding. The display 110 of the virtual window device provides a first output 120 for rendering a first image of a view through a window. The lighting element 170 is exemplified as eight light sources, but the lighting element 170 may comprise substantially any number of light sources, one or more (linear) arrays of lighting elements, etc. The lighting element 170 is arranged within the virtual lighting device 100 at a distance, D, from the second plane, B, along the axis, C, wherein D<|B−A|. The lighting element 170a is arranged within a cavity or recess 175 of the frame 150. By this arrangement of the lighting element 170a of the virtual window device 100, the lighting element 170a may be invisible or 'hidden' for an observer 205 positioned at an angle with respect to the virtual window device 100. For example, in case the cavity or recess 175 has an opening diameter, W, and an observer 205 is positioned at a distance, L, away from the artificial window device 100 (i.e. along the axis, C) and at a distance, K, along a direction parallel to the first plane, A, the distance D may be chosen such that D>W·L/(2K).

Figure 6A:
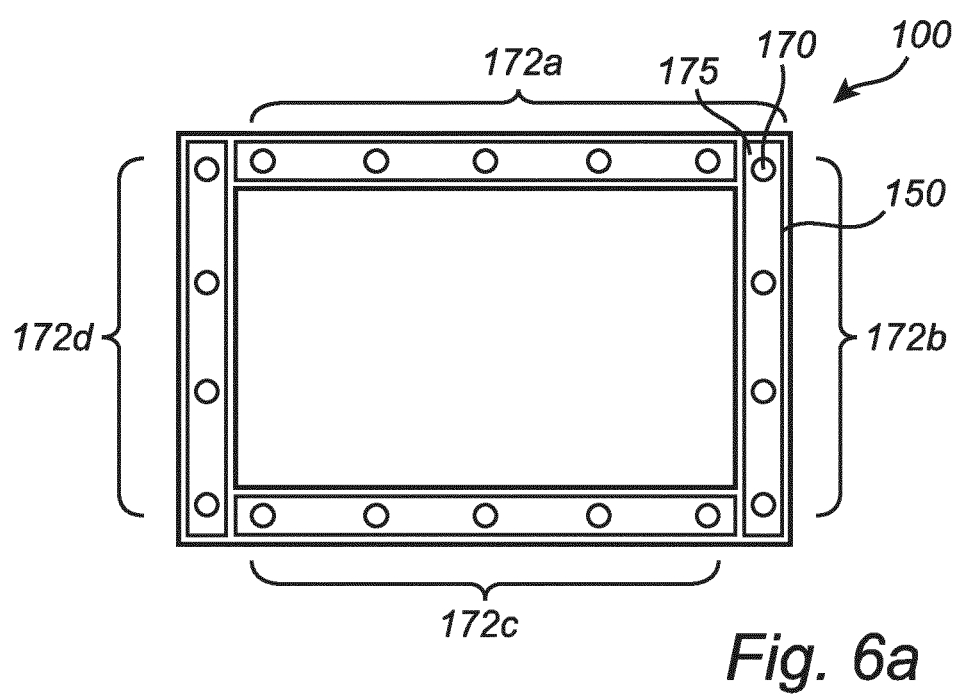
Figure 6B:
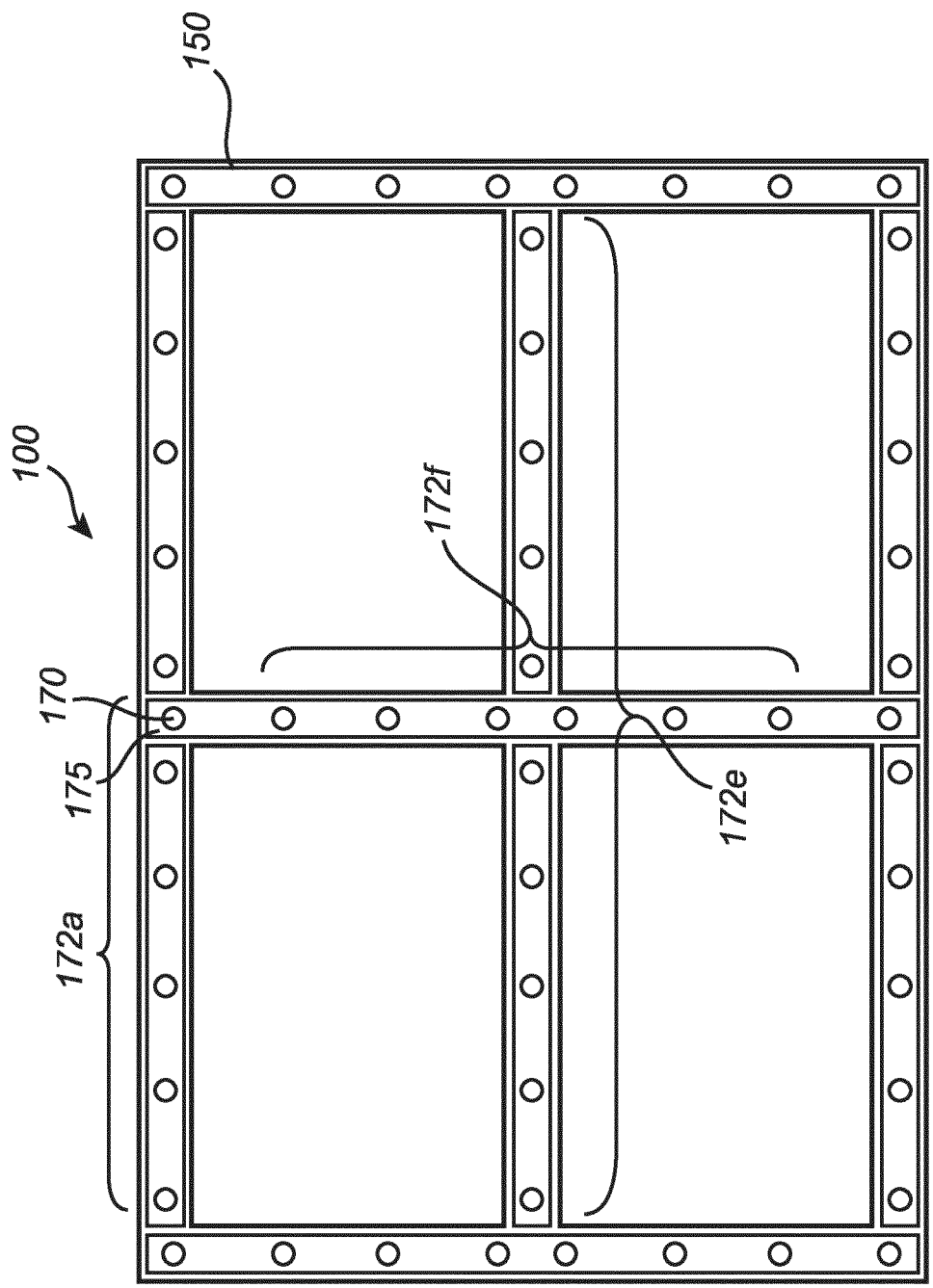

FIGS. 6a,b schematically show virtual window devices 100 according to exemplifying embodiments of the present invention, and may represent a view from below (along the axis C) of the virtual window device 100 as exemplified in FIG. 5. In FIG. 6a, the frame 150 is rectangular and comprises four side portions. The lighting element 170 is exemplified as a plurality of light sources, wherein each light source is arranged within a respective cavity or recess 175. The light sources of each of the four sides of the frame 150 may constitute a linear lighting element array 172a-d, and each of these linear lighting element arrays may be controllable by the unit in order to control the directionality of the second output emitted by the lighting element 170 as a function of at least one content property of the first image. For example, the unit may be configured to control a first pair 172a and 172c of the four linear lighting element arrays separately from the second pair 172b and 172d of the four linear lighting element arrays, due to their respective perpendicular orientation. FIG. 6b shows a similar virtual window device 100 of that disclosed in FIG. 6a, albeit the lighting element 170 is also provided in the center of the frame 150. Hence, in addition to the four linear lighting element arrays arranged within the rectangular frame 150 as described in FIG. 6a, the virtual window device 100 further comprises two linear lighting element arrays 172e,f arranged perpendicular to each other in the center of the virtual window device 100.

The frame(s) of one or more of the virtual devices 100 as exemplified in FIGS. 1-6 may furthermore comprise a light-emitting element, wherein the unit is coupled to the light-emitting element and is configured to control the light emitted from the light-emitting element as a function of at least one of the at least one content property of the first image, and the directionality of the second output. Furthermore, the unit may be configured to register a content property of the light in an environment of the virtual window device 100 and to control the light emitted from the light-emitting element as a function of the registered content property of the light. According to yet another example, the frame may be rectangular and comprise four side portions, wherein the light-emitting element is arranged within the four side portions, and the unit is configured to control the light emitted from the light-emitting element in each side portion.

The person skilled in the art realizes that the present invention by no means is limited to the preferred embodiments described above. On the contrary, many modifications and variations are possible within the scope of the appended claims. For example, one or more of the virtual window device 100, the display 110, the frame 150, etc., may have different shapes, dimensions and/or sizes than those depicted/described.

The invention claimed is:

1. A virtual window device, comprising
  a display arranged in a first plane (A), wherein the display is arranged to provide a first output for rendering a first image of a view through a window onto a virtual planar surface that is oriented parallel to the display along an axis (C), perpendicular to the first plane (A),
  a frame (150), wherein the frame projects from the display, and wherein an edge of the frame, oppositely arranged the display, spans a second plane (B), parallel to the first plane (A),
  a lighting element configured to emit a second output onto the virtual planar surface, wherein the lighting element is arranged within the virtual window device at a distance (D) from the second plane (B), along the axis (C), wherein the second output has a directionality, the directionality being one or more of a spatial direction, a beam angle, a beam width, a light output distribution and a diffusivity, and
  a unit configured to register a content property of the first image and to control the directionality of the second output as a function of the registered content property of the first image.

2. The virtual window device of claim 1, wherein the lighting element comprises at least
  a first light source arranged to emit light with a first directionality, and
  a second light source arranged to emit light with a second directionality, different from the first directionality,
  wherein the unit is coupled to the lighting element and is configured to operate at least one of the first light source and the second light source in order to control the directionality of the second output.

3. The virtual window device of claim 1, wherein the unit is configured to control the directionality of the second output so that the second output is provided onto a virtual cylindrical surface that is oriented perpendicular to the virtual planar surface.

4. The virtual window device of claim 1, wherein the unit is configured to control the directionality of the second output as a function of time.

5. The virtual window device of claim 1, wherein the lighting element is arranged in the first plane (A), adjacent the display.

6. The virtual window device of claim 1, wherein the display has a polygon shape, and the lighting element is arranged at a corner of the display.

7. The virtual window device of claim 6, wherein the lighting element comprises a linear lighting element array arranged along an edge of the display.

8. The virtual window device of claim 1, wherein the lighting element is arranged within the frame.

9. The virtual window device of claim 1, wherein the lighting element is arranged within a cavity of the display.

10. The virtual window device of claim 1, wherein the unit is configured to register a property of the light in an environment of the virtual window device and to control the second output as a function of the registered property of the light.

11. The virtual window device of claim 1, wherein the frame comprises the light-emitting element, wherein the unit is coupled to the light-emitting element and is configured to control the light emitted from the light-emitting element as a function of at least one of
    the at least one content property of the first image, and
    the directionality of the second output.

12. The virtual window device of claim 11, wherein the unit is configured to register a property of the light in an environment of the virtual window device and to control the light emitted from the light-emitting element as a function of the registered property of the light.

13. The virtual window device of claim 11, wherein the frame is rectangular and comprises four side portions, wherein the light-emitting element is arranged within the four side portions, and the unit is configured to control the light emitted from the light-emitting element in each side portion.

* * * * *